United States Patent
Yang et al.

(10) Patent No.: US 10,425,316 B2
(45) Date of Patent: Sep. 24, 2019

(54) HEART BEAT MONITORING FOR BROADBAND ACCESS DEVICES AND ENTERPRISE DEVICES

(71) Applicants: Jigang Yang, Cedar Park, TX (US); Bahadir Danisik, Austin, TX (US)

(72) Inventors: Jigang Yang, Cedar Park, TX (US); Bahadir Danisik, Austin, TX (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/720,924

(22) Filed: Sep. 29, 2017

(65) Prior Publication Data

US 2019/0104044 A1    Apr. 4, 2019

(51) Int. Cl.
*H04L 12/26* (2006.01)
*H04L 12/24* (2006.01)

(52) U.S. Cl.
CPC .......... *H04L 43/10* (2013.01); *H04L 41/0604* (2013.01); *H04L 41/0631* (2013.01); *H04L 43/0811* (2013.01); *H04L 43/0823* (2013.01)

(58) Field of Classification Search
CPC .......... H04L 29/12528; H04L 41/0631; H04L 41/0806; H04L 43/10; H04L 12/24; H04L 12/26; H04L 41/0604; H04L 43/0811; H04L 43/0823
See application file for complete search history.

(56) References Cited

U.S. PATENT DOCUMENTS

| 6,072,857 A * | 6/2000 | Venkateshwaran .......... H04M 3/2254 379/15.01 |
| 6,574,197 B1 * | 6/2003 | Kanamaru .......... H04L 43/0817 370/230 |
| 6,607,493 B2 * | 8/2003 | Song .................. A61B 5/02455 482/148 |

(Continued)

FOREIGN PATENT DOCUMENTS

| EP | 2012502 A1 * | 1/2009 | .......... H04L 29/125 |
| EP | 2096794 A1 * | 9/2009 | ......... H04L 41/5012 |
| EP | 3101872 A1 | 12/2016 | |

OTHER PUBLICATIONS

TR-069, "CPE WAN Management Protocol V1.1", Version: Issue 1 Amendment 2, Version Date: Dec. 2007, Broadband Forum Technical Report, Sep. 9, 2014,pp. 1-138.*

(Continued)

*Primary Examiner* — Tri H Phan
(74) *Attorney, Agent, or Firm* — Harness, Dickey & Pierce, P.L.C.

(57) ABSTRACT

A heartbeat monitoring apparatus monitors the status of CPE devices based on received inform messages including events or event codes and heartbeat monitoring parameters. The heartbeat monitoring apparatus may generate and send alarm messages to external systems upon detecting a failure (e.g., offline, reboot, etc.) status of a CPE device. The heartbeat monitoring parameters may include an indication of which CPE devices (e.g., type of device, location of devices, or the (Continued)

like) are to be monitored, a heartbeat interval and subinterval, the frequency of a heartbeat check for alarms, or the like. The inform messages may include HEARTBEAT events for the CPE devices.

24 Claims, 3 Drawing Sheets

(56) References Cited

U.S. PATENT DOCUMENTS

| | | | |
|---|---|---|---|
| 6,834,302 B1* | 12/2004 | Harvell | H04L 29/12066 709/224 |
| 7,839,870 B2* | 11/2010 | Siripunkaw | H04L 12/2801 370/401 |
| 7,917,615 B2 | 3/2011 | Huang | |
| 8,843,622 B1 | 9/2014 | Graham et al. | |
| 9,479,341 B2* | 10/2016 | Bugenhagen | H04L 12/14 |
| 9,537,715 B2 | 1/2017 | Baba | |
| 9,930,064 B1* | 3/2018 | Sherwell | H04L 41/28 |
| 2006/0077988 A1* | 4/2006 | Cheng | H04L 29/12009 370/401 |
| 2009/0180390 A1* | 7/2009 | Lin | H04L 29/06027 370/252 |
| 2009/0268609 A1 | 10/2009 | Koch et al. | |
| 2014/0280967 A1 | 9/2014 | Bao et al. | |

OTHER PUBLICATIONS

P. Beaulah Soundarabai et al. "Load balancing with availability checker and load reporters (LB-ACLRs) for improved performance in distributed systems" Devices, Circuits and Systems (ICDCS), Oct. 16, 2014.

International Search Report and Written Opinion dated Jan. 15, 2019 in International Application No. PCT/US2018/053815.

DSLHome-Technical Working Group et al., "CPE WAN Management Protocol TR-069" May 2004, retrieved from "http://www.dslforum.org/techwork/tr/TR-069.pdf".

* cited by examiner

HEART BEAT MONITORING FOR BROADBAND ACCESS DEVICES AND ENTERPRISE DEVICES

BACKGROUND

If a broadband access or enterprise device goes offline or is rebooted, immediate recognition and action by a network operator may suppress impact to customers connecting to broadband services through the device.

SUMMARY

One or more example embodiments relate to methods, apparatuses or computer-readable storage mediums for heartbeat monitoring of broadband access or enterprise devices. Monitoring the heartbeat of a broadband access or enterprise device may enable a network operator to recognize and remedy failure of the broadband access or enterprise device, thereby suppressing impact to customers.

At least one example embodiment provides a device status monitoring apparatus for monitoring status of devices in a network, the device status monitoring apparatus comprising: a memory storing computer-readable instructions; and at least one processor. The at least one processor is configured to execute the computer-readable instructions to: determine that a heartbeat message has not been received from a customer premises equipment device during a current heartbeat interval; update device status information for the customer premises equipment device in response to determining that the heartbeat message has not been received from the customer premises equipment device during the current heartbeat interval; and generate an alarm message informing an external system of the updated device status information for the customer premises equipment device.

At least one other example embodiment provides a method for monitoring status of devices in a network, the method comprising: determining that a heartbeat message has not been received from a customer premises equipment device during a current heartbeat interval; updating device status information for the customer premises equipment device in response to determining that the heartbeat message has not been received from the customer premises equipment device during the current heartbeat interval; and generating an alarm message informing an external system of the updated device status information for the customer premises equipment device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

As discussed herein, broadband access or enterprise devices may be collectively referred to as Customer Premises Equipment (CPE) devices. A CPE device is understood to be a hardware device or equipment typically located at the home or business of a customer. Example CPE devices include residential gateways, routers, Optical Network Terminals (ONTs), Digital Subscriber Line (DSL) devices, WiFi access points, WiFi extenders, fixed wireless access units, Small Cell devices, broadband gateways, or the like.

As mentioned above, if a CPE device goes offline or is rebooted, network operators need to take immediate action to suppress impact to customers connecting to broadband services through the CPE device. In order to do so, network operators need up-to-date status information for the CPE device.

Conventional management protocols for CPE devices are TR-069 and the Simple Network Management Protocol (SNMP). Because neither of these protocols are connection oriented, the instant check of a CPE device status is done via a server initiated ping or connection (e.g., TR-069 connection request through a Hyper-Text-Transfer-Protocol (HTTP) GET message). However, as numbers of deployed CPE devices increase (e.g., into the millions), the capability of such checks is limited in that it is almost cost prohibitive to check every CPE device constantly.

One or more example embodiments provide a load balancer component (load balancer) and a heartbeat monitoring apparatus (also referred to as a device status monitoring apparatus), which can be seamlessly inserted into the traffic path between the CPE devices and a device management system. The load balancer intercepts device traffic (including heartbeat messages, inform messages and other traffic) sent by the CPE devices, and forwards the messages including heartbeat events to the heartbeat monitoring apparatus as well as to the device management system (when applicable).

The heartbeat monitoring apparatus monitors the status of the CPE devices based on the received heartbeat messages and heartbeat monitoring parameters, and may generate and send alarms (alarm messages) to one or more external systems upon detecting a failure (e.g., offline, reboot, etc.) status of a CPE device. The heartbeat monitoring parameters may include an indication of which CPE devices (e.g., type of device, location of devices, or the like) are to be monitored, a length of a heartbeat interval, a length of a heartbeat subinterval, the frequency of a heartbeat check for alarms, or the like.

As discussed herein, a heartbeat interval refers to a time interval during which the heartbeat monitoring apparatus 106 expects to receive at least one heartbeat message (also referred to as a heartbeat) from a CPE device. In one example, the length of a heartbeat interval may be about 5 minutes. In this case, the heartbeat monitoring apparatus 106 expects to receive a heartbeat message from a CPE device at least once every 5 minutes. If a heartbeat message for a CPE device is not received before expiration of a current heartbeat interval, then the CPE device is determined to be in a failure state. The length of a heartbeat interval (as well as its subintervals) may be set by a network operator based on empirical data, network conditions, or the like.

According to at least some example embodiments, the heartbeat message (including a heartbeat event) may also (or alternatively) be sent utilizing an event code that is sent by a CPE device in a separate inform session, without other event codes, thereby potentially reducing the burden on one or more device management servers (e.g., an Auto-Configuration Server (ACS)) to have to process other event codes when only a heartbeat is necessary. Inform messages including other inform events may also constitute heartbeat messages.

In the context of TR-069, for example, the event code may be referred to as a HEARTBEAT Event. A HEARTBEAT Event may differ from a PERIODIC Event in that the HEARTBEAT Event may include only Forced Inform parameters without other Events in the same Inform session to suppress undue load on the device management system. The HEARTBEAT Event may be communicated by a CPE device using the Inform method when the conditions of the CPE device's heartbeat policy are fulfilled. Unlike conventional inform messages, a HEARTBEAT message including a HEARTBEAT Event may not carry outstanding event codes (e.g., periodic, boot, value change) and associated parameters (e.g., boot parameters, value change parameters).

To reduce the load on the device management system 110, the load balancer 104 may filter out HEARTBEAT messages including HEARTBEAT Events, such that these messages are sent to the heartbeat monitoring apparatus, but not forwarded to the device management system.

In one example, conditions of a CPE device's heartbeat policy triggering a heartbeat may include device internal timer triggered specifically for the purpose of generating a heartbeat, device reboot, device internal value change, or the like.

Although discussed herein with regard to the TR-069 management protocol, example embodiments may also be applicable to other management protocols such as SNMP. One or more example embodiments do not require modifications of software already on the CPE devices nor modification or replacement of the existing device management systems, so as to be transparent to existing device management systems.

Figure 1:
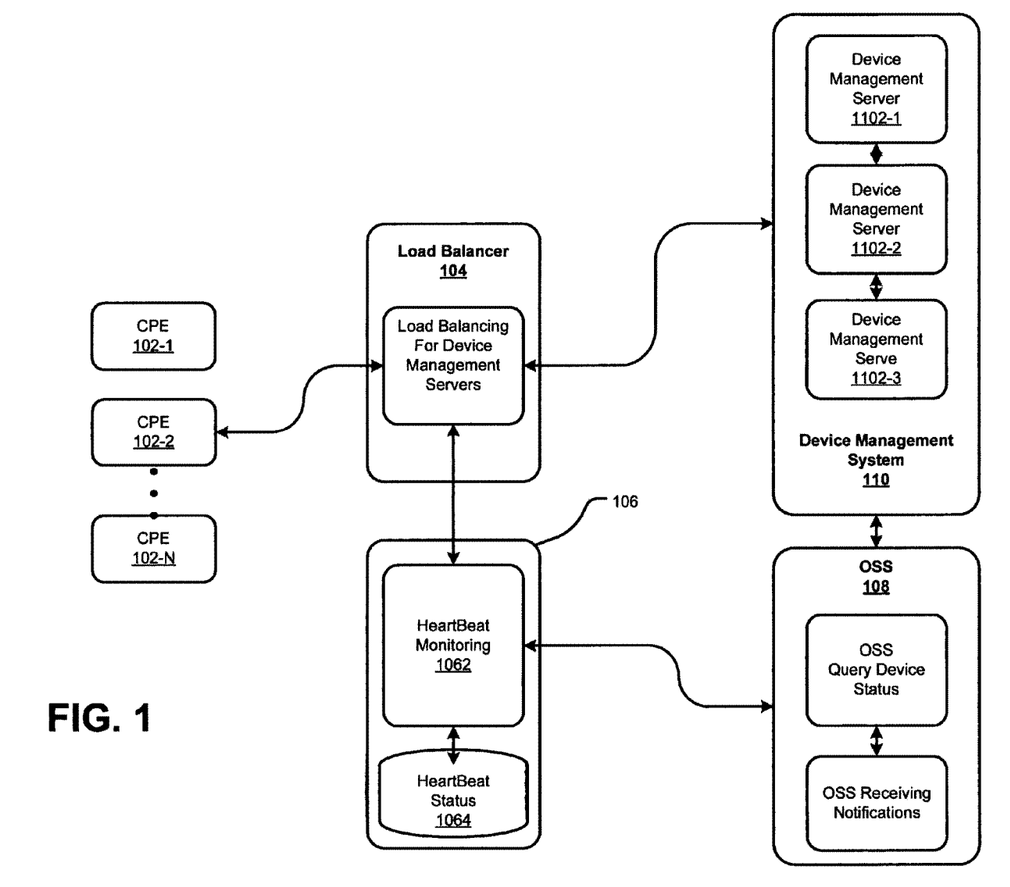
FIG. 1 is a block diagram illustrating a portion of network architecture including a load balancer and heartbeat monitoring apparatus configured to perform heart beat monitoring, according to an example embodiment.

FIG. 1 is a block diagram illustrating a portion of a network architecture including a load balancer 104 a heartbeat monitoring apparatus 106, according to an example embodiment.

Referring to FIG. 1, the heartbeat monitoring apparatus 106 includes a heartbeat monitor 1062 operatively coupled to a heartbeat status repository 1064. As discussed herein, the heartbeat monitoring apparatus 106 is understood as a computing device or computer, which is provided with a network interface for communicating with a network via one or more other network devices. Possible implementations of the heartbeat monitoring apparatus 106 may include a computer, a server, a router, a switch, a modem, a portable device, a tablet computer, etc. Alternatively, the heartbeat monitoring apparatus 106 may be understood as a computing system or a cloud system, possibly comprising features in a distributed way. In this regard, the heartbeat monitoring apparatus 106 may be implemented by way of one or more processors executing computer-readable instructions as discussed in more detail later.

The heartbeat status repository 1064 may be stored in a memory accessible by the heartbeat monitor 1062. In at least one example, the heartbeat status repository 1064 may store heartbeat records for each CPE device from which a heartbeat has been received. A heartbeat record for a CPE device may include a device identifier, a current missing heartbeat counter value MISSING_HB_CTR for the CPE device, a time stamp for a last successfully received heartbeat for the CPE device, and a CPE device status (e.g., successful or failure state).

Still referring to FIG. 1, the heartbeat monitoring apparatus 106 is operatively coupled to a load balancer 104, and to an operations support system (OSS) service provider (hereinafter OSS) 108.

The load balancer 104 is understood as a computing device or computer which is provided with a network interface for communicating via one or more other network edge devices to a network. Possible implementations of the load balancer may include a computer, a server, a router, a switch, a modem, a portable device, a tablet computer, etc. Alternatively, the load balancer may be understood as a computing system or a cloud system, possibly comprising features in a distributed way.

The OSS 108 is a set of one or more service provider management systems that provide management aspects to configure and troubleshoot services and network elements located within a service provider's network.

The load balancer 104 is operatively coupled to a plurality of CPE devices 102-1, 102-2, . . . , 102-N and a device management system 110.

The device management system 110 includes a plurality of device management servers 1102-1, 1102-2 and 1102-3, and is operatively coupled to the OSS 108. A device management server may manage multiple CPE devices by communicating with each CPE during a session according to a device management system protocol, such as the TR-069 protocol.

Although not specifically shown in FIG. 1, the CPE devices 102-1, 102-2, . . . , 102-N, the load balancer 104, the heartbeat monitoring apparatus 106, the OSS 108 and the device management system 110 may be operatively coupled to one another via one or more networks. Further, although illustrated as separate elements, the load balancer 104 and the heartbeat monitoring apparatus 106 may reside on the same server (e.g., may be virtualized at the same server).

Still referring to FIG. 1, according to one or more example embodiments, once the CPE devices 102-1, 102-2, . . . , 102-N are online (e.g., powered and initialized so as to communicate with the service provider's network), the load balancer 104 intercepts device traffic (including heartbeat messages, inform messages and other device traffic) sent by the CPE devices 102-1, 102-2, . . . , 102-N, and performs load balancing functions for the device traffic based on load sharing logic to direct the device traffic to one of the device management servers 1102-1, 1102-2, 1102-3. While performing the load balancing functions, the load balancer 104 also forwards received messages identified as including heartbeat events to the heartbeat monitoring apparatus 106.

The load balancer 104 may filter out frequent heartbeat messages (e.g., including HEARTBEAT Events) deemed to be unnecessary for the device management system 110, such that these messages are not forwarded to the device management system 110.

In response to receiving a heartbeat for a CPE device from the load balancer 104, the heartbeat monitor 1062 creates a heartbeat record for the CPE device (if none already exists), stores the time stamp for the received heartbeat as the last heartbeat time stamp, and sets the device status for the CPE device to the "successful" state. The heartbeat monitor 1062 then initiates the periodic heartbeat monitoring procedure for the CPE device.

In one example, the periodicity of the periodic heartbeat monitoring process may be a fraction (e.g., ⅕) of the length of the heartbeat interval for the CPE device. For example, if the length of the heartbeat interval is about 5 minutes, then the heartbeat monitor 1062 may perform an iteration of the periodic heartbeat monitoring process every 1 minute. In this context, the heartbeat interval may have a plurality of (e.g., 5) subintervals and the heartbeat monitor 1062 may perform an iteration of the periodic heartbeat monitoring process after expiration of each subinterval. The heartbeat monitor 1062 may perform the periodic heartbeat monitoring process for each of the CPE devices identified in the heartbeat status repository 1064. A timer may be used to determine expiration of the heartbeat interval as well as the plurality of heartbeat subintervals.

The periodic heartbeat monitoring procedure will be discussed in more detail later with regard to FIG. 2.

The heartbeat monitor 1062 may also send alarms to one or more external systems, such as the device management system 110 or the OSS 108, based on the statuses of the CPE devices. An alarm may include, for example, a list of devices currently missing a heartbeat (in a heartbeat failure or fault state), a last heartbeat time stamp, a count of missed heartbeats for the CPE device, or the like.

According to one or more example embodiments, the heartbeat monitoring apparatus 106 provides flexible configurations and heartbeat monitoring parameters, such as the CPE devices to be monitored, the definition of the heartbeat interval, the frequency of the heartbeat check for alarms, or the like. These heartbeat monitoring parameters may be set by network operators based on empirical evidence, network conditions, or other information.

Example operation of the heartbeat monitoring apparatus 106 and the periodic heartbeat monitoring process will now be discussed in more detail with regard to FIG. 2.

Figure 2:
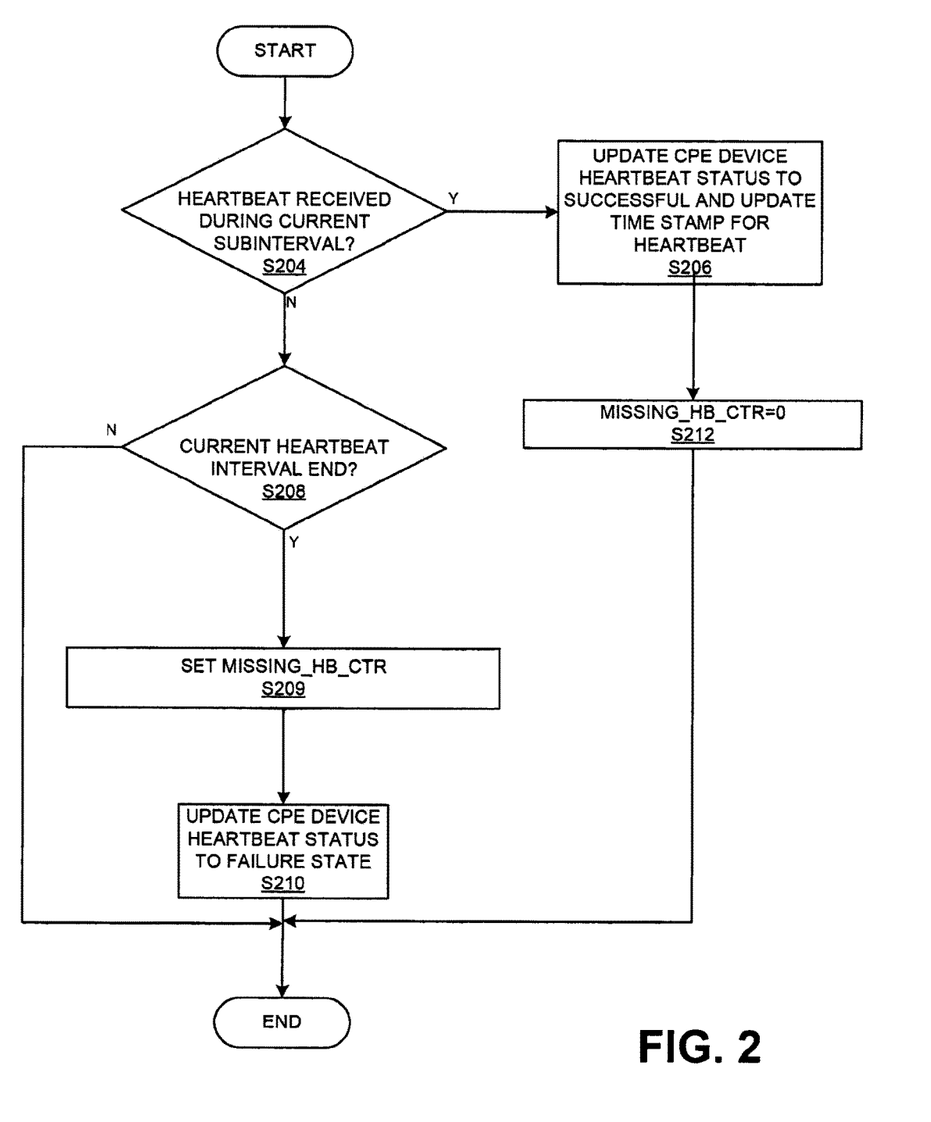
FIG. 2 is a flowchart illustrating a method for heartbeat monitoring, according to an example embodiment.

FIG. 2 is a flow chart illustrating a method for periodic heartbeat monitoring according to an example embodiment.

For example purposes, a single iteration of the method shown in FIG. 2 will be discussed with regard to the CPE device 102-1 in FIG. 1. However, it will be understood that the method may be applied iteratively to each of the CPE devices 102-2, . . . , 102-N in the same or substantially the same manner. Further, although FIG. 2 may be discussed herein with regard to heartbeat messages and heartbeat events, a CPE device may be recognized as having a "heartbeat" by the heartbeat monitoring apparatus 106 if any specified device event (including other inform events) is received by the heartbeat monitoring apparatus 106 within the heartbeat interval for the CPE device. For the purposes of discussing FIG. 2, the messages and events will be collectively referred to as a heartbeat.

As mentioned briefly above, in response to receiving a heartbeat for the CPE device 102-1 (from the load balancer 104), the heartbeat monitor 1062 searches the heartbeat status repository 1064 for a device identifier of the CPE device 102-1 to determine whether a heartbeat record for the CPE device 102-1 exists in the heartbeat status repository 1064.

If a heartbeat record for the CPE device 102-1 already exists, then the heartbeat monitor 1062 initializes a value of a missing heartbeat counter MISSING_HB_CTR for the CPE device 102-1 to 0 (i.e., MISSING_HB_CTR=0), updates the last heartbeat time stamp for the CPE 102-1 to the time at which the heartbeat was received, and initiates the periodic heartbeat monitoring procedure shown in FIG. 2 for the CPE device 102-1. As discussed in more detail below, the missing heartbeat counter MISSING_HB_CTR counts the number of consecutive time intervals during which a heartbeat is not received for the CPE device 102-1.

If, however, a heartbeat record for the CPE device 102-1 does not exist, then the heartbeat monitor 1062 creates a heartbeat record for the CPE device 102-1. In creating the heartbeat record for the CPE device 102-1, the heartbeat monitor 1062 initializes a value of the missing heartbeat counter MISSING_HB_CTR for the CPE device 102-1 to 0 (i.e., MISSING_HB_CTR=0), stores the time stamp for the received heartbeat as the last heartbeat time stamp, and sets the device status for the CPE device 102-1 to the "successful" state. Once the heartbeat record is created, the heartbeat monitor 1062 then initiates the periodic heartbeat monitoring procedure for the CPE device 102-1.

Referring now to FIG. 2, at step S204, after expiration of the current heartbeat subinterval, the heartbeat monitor 1062 determines whether a heartbeat for the CPE device 102-1 was received during the current subinterval. According to at least one example embodiment, the heartbeat monitor 1062 determines whether a heartbeat for the CPE device 102-1 was received during the current heartbeat subinterval by reading the last heartbeat time stamp for the CPE device 102-1 from the heartbeat status repository 1064, and comparing the last heartbeat time stamp with the current time. If the elapsed time between the last heartbeat time stamp and the current time is less than the length of the heartbeat subinterval, then the heartbeat monitor 1062 determines that a heartbeat has been received during the current heartbeat subinterval. Otherwise, the heartbeat monitor 1062 determines that a heartbeat was not received during the current heartbeat subinterval.

If the heartbeat monitor 1062 determines that a heartbeat for the CPE device 102-1 was received during the current heartbeat subinterval, then at step S206 the heartbeat monitor 1062 updates the heartbeat status for the CPE device 102-1 at the heartbeat status repository 1064 to a successful state, and updates the last heartbeat time stamp for the last heartbeat for the CPE device 102-1 to reflect the time at which the most recent heartbeat was received. The heartbeat monitor 1062 then sets the missing heartbeat counter MISSING_HB_CTR to 0 (i.e., MISSING_HB_CTR=0) at step S212, and the current iteration of the process for the CPE device 102-1 terminates.

Returning to step S204, if a heartbeat for the CPE device 102-1 was not received during the current heartbeat subinterval, then the heartbeat monitor 1062 determines whether the current heartbeat interval has expired at step S208.

If the current heartbeat interval has not expired (e.g., the current heartbeat subinterval is not the last subinterval in the current heartbeat interval), then the current iteration of the process for the CPE device 102-1 terminates.

Returning to step S208, if the current heartbeat interval has expired, then at step S209 the heartbeat monitor 1062 updates the value of the missing heartbeat counter MISSING_HB_CTR stored in the heartbeat status repository 1064. In one example, the heartbeat monitor 1062 may increment the value of the missing heartbeat counter MISSING_HB_CTR (MISSING_HB_CTR=MISSING_HB_CTR+1) stored in the heartbeat record for the CPE device 102-1.

In another example, the heartbeat monitor 1062 calculates the number of missing heartbeats by dividing the elapsed time between last heartbeat time stamp and the current time by the length of the heartbeat interval. For example, if the elapsed time between the last heartbeat time stamp and the current time is 12 minutes, the length of the heartbeat interval is 5 minutes, and the length of the heartbeat subinterval is 1 minute, then the heartbeat monitor 1062 calculates 2 missing heartbeats (i.e., 12/5=2). The heartbeat monitor 1062 then stores the calculated value as the value for the missing heartbeat counter MISSING_HB_CTR (i.e., MISSING_HB_CTR=2) in the heartbeat record.

At step S210, the heartbeat monitor 1062 updates the heartbeat status for the CPE device 102-1 at the heartbeat status repository 1064 to indicate a failure state. The current iteration of the periodic heartbeat monitoring process then terminates.

Although not specifically shown in FIG. 2, the heartbeat monitoring apparatus 106 may send alarms to the device management system 110 or the OSS 108 indicating the CPE devices for which a heartbeat has not been received (e.g., CPE devices for which the missing heartbeat counter MISSING_HB_CTR is greater than 0). As discussed above, the alarms may include a list of devices currently missing a heartbeat, a most recent heartbeat time stamp for the CPE devices, a current value of the missing heartbeat counter MISSING_HB_CTR (count of missed heartbeats) for the CPE devices, or the like.

In one example, the heartbeat monitoring apparatus 106 may send an alarms to the device management system 110 or the OSS 108 in response to identifying a threshold number of CPE devices for which a heartbeat has not been received during a most recent heartbeat interval, or if the missing heartbeat counter MISSING_HB_CTR for a CPE device reaches a threshold value. In one example, the heartbeat monitoring apparatus 106 may send alarms for all devices having missed a heartbeat (e.g., having a failure state).

The OSS 108 or the device management system 110 may also query the heartbeat status repository 1064 (e.g., via a programming interface) to obtain the stored heartbeat status (and associated) information for one or more CPE devices. In one example, the OSS 108 or the device management system 110 may query the heartbeat status repository 1064 in response to receiving a status from the heartbeat monitoring apparatus 106. In another example, the OSS 108 or the device management system 110 may query the heartbeat status repository 1064 periodically.

According to at least some example embodiments, the heartbeat monitoring apparatus 106 may be horizontally scalable, such that multiple heartbeat monitoring apparatuses may operate in parallel sharing the same in-memory database.

Figure 3:
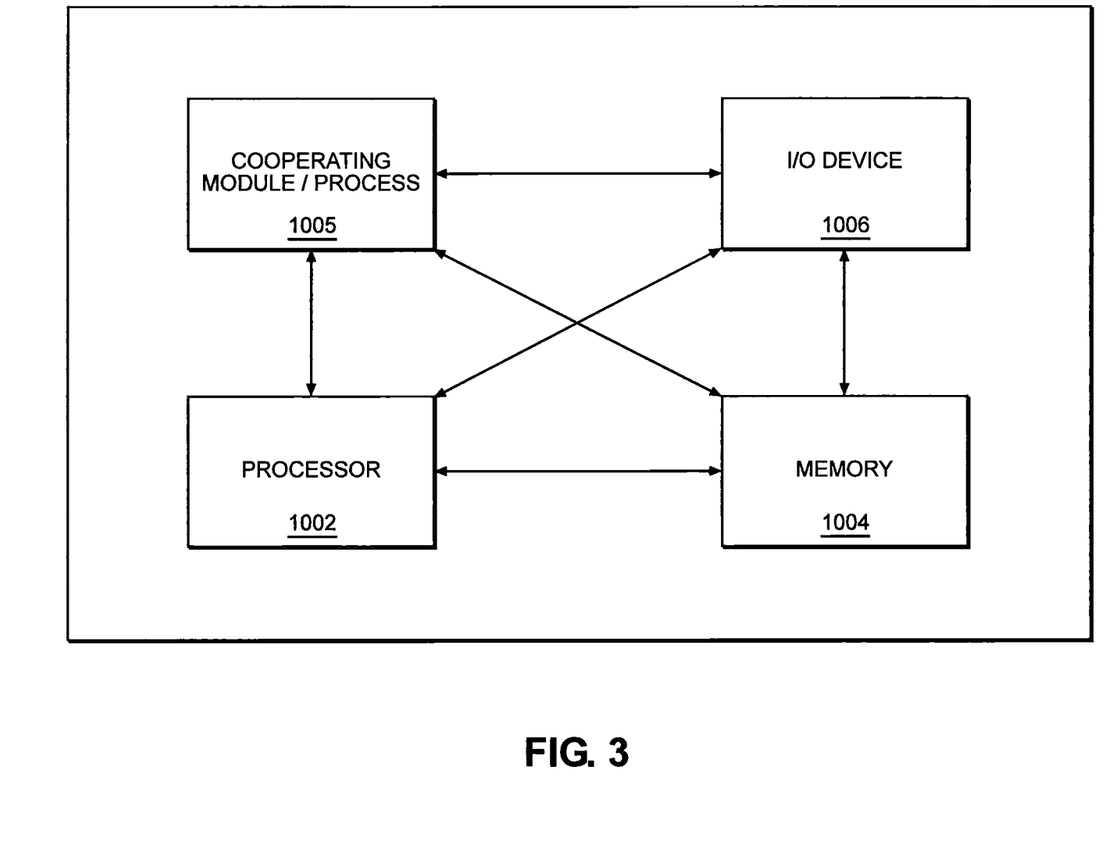
FIG. 3 provides a general architecture and functionality suitable for implementing functional elements described herein or portions of functional elements described herein.

FIG. 3 depicts a high-level block diagram of a computer, computing or electronic device suitable for use in implementing, inter alia, CPE devices, load balancers, heartbeat monitoring apparatuses, device management servers, as well as other network elements and/or devices.

Referring to FIG. 3, the computer 1000 includes one or more processors 1002 (e.g., a central processing unit (CPU) or other suitable processor(s)) and a memory 1004 (e.g., random access memory (RAM), read only memory (ROM), and the like). The computer 1000 also may include a cooperating module/process 1005. The cooperating process 1005 may be loaded into memory 1004 and executed by the processor 1002 to implement functions as discussed herein and, thus, cooperating process 1005 (including associated data structures) may be stored on a computer readable storage medium (e.g., RAM memory, magnetic or optical drive or diskette, or the like). With regard to the heartbeat monitoring apparatus 106, the heartbeat status repository 1064 may be stored in a memory, such as memory 1004.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing CPE devices, clients, gateways, nodes, agents, controllers, computers, cloud based servers, web servers, proxies or proxy servers, application servers, load balancers or load balancing servers, heartbeat monitors, device management servers, or the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, CPE devices, endpoints, clients, gateways, nodes, agents controllers, computers, cloud based servers, web servers, application servers, proxies or proxy servers, load balancers or load balancing servers, heartbeat monitors, device management servers, or the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The CPE devices, endpoints, clients, gateways, nodes, agents, controllers, computers, cloud based servers, web servers, application servers, proxies or proxy servers, load balancers or load balancing servers, heartbeat monitors, device management servers, or the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A device status monitoring apparatus for monitoring status of devices in a network, the device status monitoring apparatus comprising:
a memory storing computer-readable instructions; and
at least one processor configured to execute the computer-readable instructions to
determine that a heartbeat message has not been received from a customer premises equipment device during a current heartbeat interval,
update device status information for the customer premises equipment device in response to determining that the heartbeat message has not been received from the customer premises equipment device during the current heartbeat interval, and
generate an alarm message informing an external system of the updated device status information for the customer premises equipment device.

2. The device status monitoring apparatus of claim 1, wherein the at least one processor is further configured to execute the computer-readable instructions to update the device status information to indicate that the customer premises equipment device is in a failure state.

3. The device status monitoring apparatus of claim 2, wherein the at least one processor is further configured to execute the computer-readable instructions to
determine that a heartbeat message has been received from the customer premises equipment device during the current heartbeat interval; and
update the device status information to indicate that the customer premises equipment device is in a successful state in response to determining that a heartbeat message has been received from the customer premises equipment device during the current heartbeat interval.

4. The device status monitoring apparatus of claim 3, wherein
the device status information includes a time stamp for the heartbeat message; and
the at least one processor is further configured to execute the computer-readable instructions to update the time stamp to indicate the time at which the heartbeat message was received during the current heartbeat interval.

5. The device status monitoring apparatus of claim 3, wherein the at least one processor is further configured to execute the computer-readable instructions to reset a missing heartbeat counter in response to determining that the heartbeat message has been received from the customer premises equipment device during the current heartbeat interval.

6. The device status monitoring apparatus of claim 1, wherein the heartbeat message is an Inform message including only Forced Inform parameters.

7. The device status monitoring apparatus of claim 1, wherein the at least one processor is further configured to execute the computer-readable instructions to generate the alarm message in response to a query from one or more external systems.

8. The device status monitoring apparatus of claim 7, wherein the one or more external systems include a device management system or an operations support system service provider.

9. The device status monitoring apparatus of claim 1, wherein the at least one processor is further configured to execute the computer-readable instructions to
count a number of consecutive heartbeat intervals during which the customer premises equipment device has not received a heartbeat message; and
generate the alarm message based on the number of consecutive heartbeat intervals.

10. The device status monitoring apparatus of claim 1, wherein the external system is a device management system or an operations support system (OSS) service provider.

11. The device status monitoring apparatus of claim 1, wherein the heartbeat message includes a HEARTBEAT event indicating that the customer premises equipment device is online.

12. The device status monitoring apparatus of claim 1, wherein the at least one processor is further configured to execute the computer-readable instructions to
calculate a number of consecutive heartbeat intervals during which the customer premises equipment device has not received a heartbeat message based on a heartbeat interval length and an elapsed time since a last received heartbeat message from the customer premises equipment device; and
store the number of consecutive heartbeat intervals in the memory.

13. A method for monitoring statuses of devices in a network, the method comprising:
determining that a heartbeat message has not been received from a customer premises equipment device during a current heartbeat interval;
updating device status information for the customer premises equipment device in response to determining that the heartbeat message has not been received from the customer premises equipment device during the current heartbeat interval; and
generating an alarm message informing an external system of the updated device status information for the customer premises equipment device.

14. The method of claim 13, wherein the updating updates the device status information to indicate that the customer premises equipment device is in a failure state.

15. The method of claim 14, further comprising:
determining that a heartbeat message has been received from the customer premises equipment device during the current heartbeat interval; and
wherein the updating updates the device status information to indicate that the customer premises equipment device is in a successful state in response to determining that a heartbeat message has been received from the customer premises equipment device during the current heartbeat interval.

16. The method of claim 15, wherein
the device status information includes a time stamp for the heartbeat message; and
wherein the updating updates the time stamp to indicate the time at which the heartbeat message was received during the current heartbeat interval.

17. The method of claim 15, wherein the updating step comprises:
resetting a missing heartbeat counter in response to determining that the heartbeat message has been received from the customer premises equipment device during the current heartbeat interval.

18. The method of claim 13, wherein the heartbeat message is an Inform message including only Forced Inform parameters.

19. The method of claim 13, wherein the updating step comprises:
- calculating a number of consecutive heartbeat intervals during which the customer premises equipment device has not received a heartbeat message based on a heartbeat interval length and an elapsed time since a last received heartbeat message from the customer premises equipment device; and
- storing the number of consecutive heartbeat intervals in a memory.

20. The method of claim 13, wherein the heartbeat message includes a HEARTBEAT event indicating that the customer premises equipment device is online.

21. A method for facilitating monitoring of a network-accessible customer premises equipment device, the method comprising:
- including only Forced Inform Parameters in a heartbeat event message; and
- communicating, by the network-accessible customer premises equipment device, the heartbeat event message to facilitate monitoring of the network-accessible customer premises equipment device.

22. The method of claim 21, wherein the heartbeat event message is communicated in an Inform session including no other events.

23. The method of claim 21, further comprising:
communicating a plurality of heartbeat event messages.

24. The method of claim 23, wherein each of the plurality of heartbeat event messages are each communicated within a heartbeat interval of a previous heartbeat event message.

* * * * *